United States Patent
Igarashi et al.

(10) Patent No.: US 7,051,589 B2
(45) Date of Patent: May 30, 2006

(54) HEATING RESISTOR FLOW RATE MEASURING INSTRUMENT

(75) Inventors: Shinya Igarashi, Naka (JP); Takayuki Saitou, Tokai (JP); Hiromu Kikawa, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/480,333

(22) PCT Filed: Jun. 13, 2001

(86) PCT No.: PCT/JP01/05022

§ 371 (c)(1),
(2), (4) Date: Jul. 27, 2004

(87) PCT Pub. No.: WO02/103301

PCT Pub. Date: Dec. 27, 2002

(65) Prior Publication Data

US 2004/0237644 A1    Dec. 2, 2004

(51) Int. Cl.
*G01F 1/68* (2006.01)
(52) U.S. Cl. .................... 73/202.5; 73/204.22
(58) Field of Classification Search ............. 73/202, 73/202.5, 204.15, 204.16, 204.21
See application file for complete search history.

(56) References Cited

U.S. PATENT DOCUMENTS 3,975,951 A * 8/1976 Kohama et al. ......... 73/204.16

| | | |
|---|---|---|
| 5,351,536 A | 10/1994 | Uchiyama |
| 5,780,735 A | 7/1998 | Kadohiro et al. |
| 6,023,969 A | 2/2000 | Feller |
| 6,125,695 A | 10/2000 | Alvesteffer et al. |

FOREIGN PATENT DOCUMENTS

| | | |
|---|---|---|
| JP | 4-34686 | 6/1992 |
| JP | 07-209051 | 8/1995 |
| JP | 7-280613 | 10/1995 |
| JP | 8-159833 | 6/1996 |

OTHER PUBLICATIONS

Copy of European Search Report dated Mar. 1, 2006.

* cited by examiner

*Primary Examiner*—Harshad Patel
(74) *Attorney, Agent, or Firm*—Crowell & Moring LLP

(57) ABSTRACT

A heating resistor flow rate measuring instrument, having a heating resistor and a thermally sensitive resistor disposed in a sub-passage of a main passage. The heating resistor is disposed in a portion of the sub-passage which has an upstream-side opening substantially perpendicular to the forward direction of a fluid flow and a downstream-side opening substantially parallel to the reverse flaw direction, and the thermally sensitive resistor is disposed in a second sub-passage portion having an upstream-side opening substantially parallel to the forward flow direction and a downstream-side opening substantially perpendicular to the reverse flow direction. Based on changes in resistor temperatures when the flow direction reverses, a precise flow rate may be determined even when a pulsation occurs in the fluid, as both a plus effect caused by a backward flow is eliminated and a value corresponding to the backward flow may be subtracted to obtain accurate flow information.

14 Claims, 11 Drawing Sheets

HEATING RESISTOR FLOW RATE MEASURING INSTRUMENT

TECHNICAL FIELD

The present invention relates to a heating resistor flow rate measuring instrument for measuring the flow rate of a fluid when the fluid flowing in the forward direction may cause a pulsation accompanying a backward flow, and more particularly to a heating resistor flow rate measuring instrument suitable for measuring the flow rate of intake air of an automobile engine.

BACKGROUND ART

JP,B 4-34686, for example, discloses one of prior-art heating resistor flow rate measuring instruments.

Also, JP,A 8-159833, for example, discloses one of heating resistor flow rate measuring instruments capable of measuring the flow rate of a fluid when the fluid flowing in the forward direction may cause a pulsation accompanying a backward flow.

In the flow rate measuring instrument disclosed in JP,A 8-159833, a sub-passage is provided in a main passage, and a heating resistor is disposed in the sub-passage. The sub-passage includes a pair of sub-passage portions that are extended substantially parallel to a center axis of the main passage and are opened in directions opposite to each other. An end of one sub-passage portion positioned away from the opening side has a communicating portion communicated with the vicinity of an opening of the other sub-passage portion. The heating resistor is disposed in each sub-passage between the two communication portions.

DISCLOSURE OF INVENTION

In the prior-art flow rate measuring instrument disclosed in the above-cited JP,B 4-34686, however, when a backward pulsating flow occurs in the fluid flowing in the forward direction, it is difficult to completely eliminate the effect of the backward pulsating flow and to precisely measure the flow rate of the forward flow.

Also, in the flow rate measuring instrument disclosed in the above-cited JP,A 8-159833, the effect of the backward pulsating flow can be eliminated to some extent, but a plurality of heating resistors and at least one thermally sensitive resistor are required, thus resulting in a problem that the circuit configuration is complicated.

The present invention has been made in view of the above-mentioned problems in the prior art, and its object is to provide a heating resistor flow rate measuring instrument which has a simplified circuit configuration and is able to precisely detect the flow rate in the forward direction even for a fluid that may cause a pulsation accompanying a backward flow, such as intake air of an automobile engine.

Particularly, an object of the present invention is to provide an air flow rate measuring instrument in which, in measurement of the flow rate of intake air of an automobile engine, a large plus error resulting when a pulsation accompanying a backward flow occurs near a throttle fully-opened stroke in a specific range of revolution speed can be eliminated and fuel control, etc. precisely responsive to operation conditions can be achieved.

To achieve the above objects, the present invention is constituted as follows.

(1) A heating resistor flow rate measuring instrument comprising a heating resistor and a thermally sensitive resistor both disposed in a main passage, and measuring the flow rate of a fluid passing through the main passage, the instrument including a first location exposed to the fluid flowing in one direction within the main passage in a larger amount than the fluid flowing in a direction opposite to the one direction; and a second location exposed to the fluid flowing in the opposite direction within the main passage in a larger amount than the fluid flowing in the one direction, wherein the heating resistor is disposed at the first location, the thermally sensitive resistor is disposed at the second location, and the flow rate of the fluid passing through the main passage is measured based on amounts of heat radiated from the heating resistor and the thermally sensitive resistor.

(2) In above (1), preferably, the heating resistor is heated to be higher than a fluid temperature in the main passage by a first predetermined temperature, and the thermally sensitive resistor is heated to be higher than the fluid temperature in the main passage by a second predetermined temperature.

(3) In above (1) or (2), preferably, the first location is provided by a first sub-passage having a first opening that faces substantially perpendicular to the fluid flowing in the one direction, and a second opening that faces substantially parallel to the fluid flowing in the opposite direction, and the second location is provided by a second sub-passage having a third opening that faces substantially perpendicular to the fluid flowing in the opposite direction, and a third opening that faces substantially parallel to the fluid flowing in the one direction.

(4) In above (1) or (2), preferably, the first location is provided by a first sub-passage having a first opening that faces substantially perpendicular to the fluid flowing in the one direction, and a second opening that faces substantially parallel to the fluid flowing in the opposite direction, and a wall portion having a surface substantially perpendicular to the lengthwise direction of the main passage is formed in the one-direction side of the second location.

(5) In above (1) or (2), preferably, the first location is provided by a first sub-passage having a first opening that faces substantially perpendicular to the fluid flowing in the one direction, and a second opening that faces substantially perpendicular to the fluid flowing in the opposite direction and has a smaller opening area than the first opening, and the second location is provided by a second sub-passage having a third opening that faces substantially perpendicular to the fluid flowing in the one direction, and a fourth opening that faces substantially perpendicular to the fluid flowing in the opposite direction and has a larger opening area than the third opening.

(6) In above (1), (2), (3), (4) and (5), preferably, the thermally sensitive resistor is heated to a temperature 20° C.–40° C. higher than the fluid temperature in the main passage.

(7) A heating resistor flow rate measuring instrument for measuring the flow rate of a fluid passing through a passage, the instrument comprising a first heating resistor radiating a larger amount of heat to the fluid flowing in one direction within the passage than to the fluid flowing in a direction opposite to the one direction; and a second heating resistor radiating a larger amount of heat to the fluid flowing in the opposite direction than to the fluid flowing in the one direction; wherein a bridge circuit including the first heating resistor and the second heating resistor is formed, the first heating resistor is heated to be higher than the second heating resistor by a certain temperature, and the flow rate of the fluid passing through the passage is measured based on the amount of heat radiated from the first heating resistor.

(8) A heating resistor flow rate measuring instrument comprising a heating resistor and a thermally sensitive resistor both disposed in a main passage, and measuring the flow rate of a fluid passing through the main passage, wherein the instrument includes a thermally-sensitive-resistor arrangement location in which the thermally sensitive resistor is disposed and radiates a larger amount of heat when the fluid flows in a direction opposite to one direction within the main passage than when the fluid flows in the one direction; the heating resistor is heated to be higher than a fluid temperature in the passage by a first predetermined temperature; the thermally sensitive resistor is heated to be higher than the fluid temperature in the passage by a second predetermined temperature; and the flow rate of the fluid passing through the passage is measured based on amounts of heat radiated from the heating resistor and the thermally sensitive resistor.

(9) In above (8), preferably, the heating resistor is disposed at a location in which the heating resistor radiates a larger amount of heat when the fluid flows in the one direction within the main passage than when the fluid flows in the opposite direction.

With the present invention, since the passage is constructed such that the thermally sensitive resistor is more easily exposed to a backward flow and the heating resistor is harder to be exposed to the backward flow, the flow rate in the forward direction can be precisely detected even for a fluid that may cause a pulsation accompanying the backward flow, such as intake air of an automobile engine.

Further, the number of resistors used is small and hence the instrument can be realized with a simple circuit configuration.

Particularly, in measurement of the flow rate of intake air of an automobile engine, a large plus error resulting when a pulsation accompanying a backward flow occurs near a throttle fully-opened stroke in a specific range of revolution speed can be eliminated and fuel control precisely responsive to operation conditions can be achieved.

BEST MODE FOR CARRYING OUT THE INVENTION

Practical embodiments of a heating resistor flow rate measuring instrument of the present invention will be described below with reference to the drawings.

Figure 1:
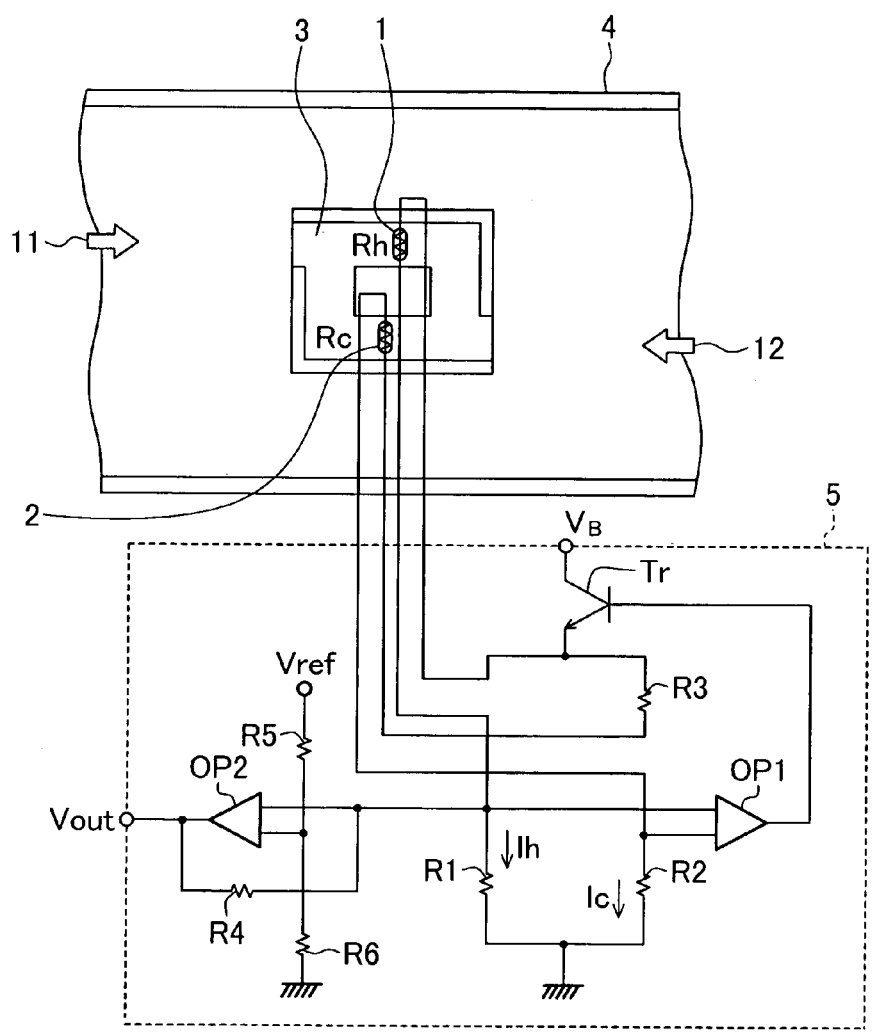
FIG. 1 is a diagram showing the basic principle of a heating resistor flow rate measuring instrument of the present invention.

FIG. 1 is a diagram showing the basic principle of a heating resistor flow rate measuring instrument of the present invention. In FIG. 1, it is assumed that a fluid flow directing rightward from the left side is a forward flow 11, and a fluid flow directing leftward from the right side is a backward flow 12.

The heating resistor flow rate measuring instrument of the present invention includes a sub-passage 3 disposed in a main passage 4. A heating resistor 1 (Rh) and a thermally sensitive resistor 2 (Rc) are disposed in the sub-passage 3.

The sub-passage 3 comprises a first sub-passage having an upstream-side opening face substantially perpendicular to the forward direction of the fluid flow and a downstream-side opening face substantially parallel to the direction opposite to the forward fluid flow, and a second sub-passage having an upstream-side opening face substantially parallel to the forward direction of the fluid flow and a downstream-side opening face substantially perpendicular to the direction opposite to the forward fluid flow.

The heating resistor 1 is disposed in the first sub-passage, and the thermally sensitive resistor 2 is disposed in the second sub-passage.

Thus, the first sub-passage including the heating resistor 1 disposed therein is constructed such that the fluid flowing in the backward direction is harder to flow into the first sub-passage than the fluid flowing in the forward direction. The second sub-passage including the thermally sensitive resistor 2 disposed therein is constructed such that the fluid flowing in the forward direction is harder to flow into the second sub-passage than the fluid flowing in the backward direction.

The heating resistor 1 is heated to a temperature about 100° C.–300° C. higher than a fluid temperature Ta in the first sub-passage, and provides an output depending on the flow rate of the fluid in accordance with the amount of heat radiated to the fluid.

Although the thermally sensitive resistor 2 is used in the prior art to detect the fluid temperature without being heated, the thermally sensitive resistor 2 in the present invention is heated to be higher than the fluid temperature Ta by about $\frac{1}{10}$ to $\frac{1}{2}$ of the temperature to which the heating resistor 1 is heated.

For example, the heating resistor 1 is heated to the fluid temperature Ta+200° C. (in fact, a temperature Tc of the thermally sensitive resistor 2 +160° C.), and the thermally sensitive resistor 2 is heated to the fluid temperature Ta+40° C.

With the construction described above, when the forward flow 11 generates in the main passage 4, the fluid flowing in the forward direction flows into the first sub-passage and the heating resistor 1 is cooled.

On the other hand, the forward flow 11 flows into the second sub-passage in a less amount and develops a small cooling action upon the thermally sensitive resistor 2. Also, since the thermally sensitive resistor 2 is heated to be 40° C. higher than the fluid temperature in the second sub-passage, the thermally sensitive resistor 2 is not heated by the heat radiated from the heating resistor 1. Accordingly, the heating resistor 1 is held in the same state as when it is heated to Ta+200° C.

Conversely, when the backward flow 12 generates in the main passage 4, the backward flow 12 acts upon the second sub-passage and the thermally sensitive resistor 2 is cooled. Although the thermally sensitive resistor 2 is heated in advance to be 40° C. higher than the fluid temperature in the second sub-passage, the temperature of the thermally sensitive resistor 2 lowers under cooling due to the backward flow.

The backward flow 12 flows into the first sub-passage in a less amount and develops a small cooling action upon the heating resistor 1.

In that case, the temperature of the thermally sensitive resistor 2 lowers from the temperature to which it has been heated so far, and shows a value close to Ta. Also, the temperature of the heating resistor 1 lowers and shows a value close to Ta+160° C. Therefore, the amount of heat radiated to the fluid is decreased, and the output of the heating resistor 1 is reduced. As a result, a plus error caused upon the generation of the backward flow is canceled as described later.

In the present invention, as described above, the thermally sensitive resistor 2 is heated in advance to be higher than the fluid temperature in the sub-passage, and the heating resistor 1 and the thermally sensitive resistor 2 are arranged such that the cooling effect upon them differs from each other between when the forward flow 11 flows in the main passage 4 and when the backward flow 12 flows in the main passage 4.

With those features, since the heating resistor 1 has a high detection sensitivity for the forward flow 11 in the main passage 4 and a low detection sensitivity for the backward flow 12 in the main passage 4, the later-described plus error caused upon the generation of the backward flow is canceled and the flow rate in the forward direction can be precisely detected even for a flow that may cause a pulsation accompanying a backward flow, such as intake air of an automobile engine.

A measurement error caused by a pulsation in a prior-art flow rate measuring instrument will now be described with reference to FIG. 2, taking as an example measurement of the flow rate of intake air in the automobile engine.

Figure 2:
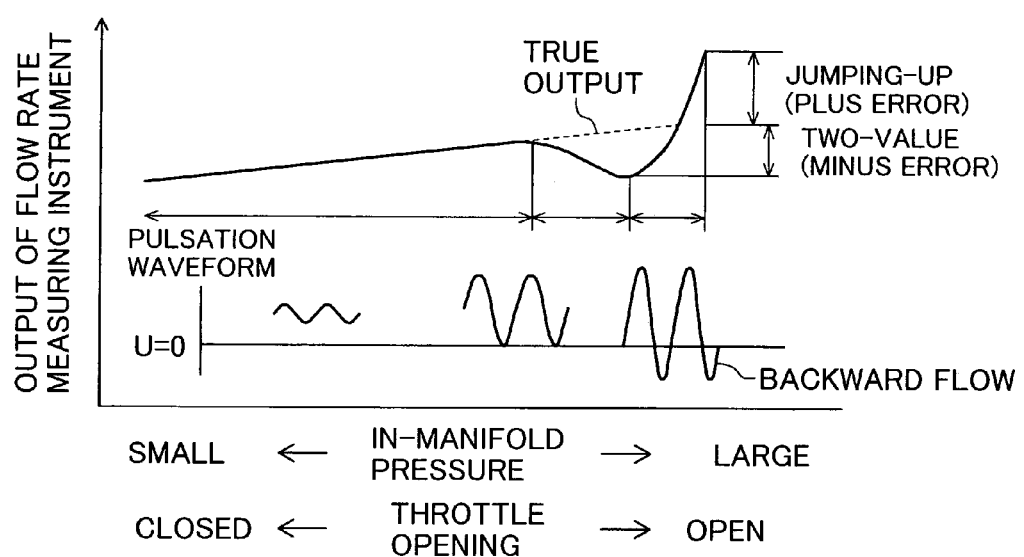
FIG. 2 is a graph showing the relationship between an air pressure in an intake manifold, which is a pressure upstream of an engine cylinder, and an output of an air flow rate measuring instrument resulting when the engine revolution speed is held constant.

FIG. 2 is a graph showing the relationship between an air pressure in an intake manifold (hereinafter referred to as an "in-manifold pressure"), which is a pressure upstream of an engine cylinder, and an output of an air flow rate measuring instrument resulting when the engine revolution speed, i.e., the pulsation period, is held constant.

In FIG. 2, the in-manifold pressure changes depending on the opening degree of a throttle valve (throttle opening), which controls the flow rate of the intake air in interlock with an accelerator pedal.

The air flow rate measuring instrument is usually disposed upstream of the throttle valve. When the throttle opening is small, an intake pulsation is small due to the contraction effect of an intake pipe, and a measurement error caused by the pulsation does not occur in the air flow rate measuring instrument. Therefore, an output of the air flow rate measuring instrument increases monotonously depending on the in-manifold pressure.

However, the intake pulsation increases with an increase of the throttle opening. In a pulsation range where a minimum value of the pulsation amplitude approaches 0, the output of the air flow rate measuring instrument is reduced in spite of the true intake flow rate increasing, thus resulting in a minus error.

Such a phenomenon is called a two-value phenomenon because the output of one air flow rate measuring instrument has two different flow rate values from each other.

The two-value phenomenon is primarily attributable to that the relationship of flow rate versus output of the heating resistor air flow rate measuring instrument is non-linear and the heating resistor air flow rate measuring instrument has a response delay. The technique called a bypassing method is known as a measure for coping with the two-value phenomenon.

According to the bypassing method, a heating resistor is disposed in a bypass passage having a bent flow path formed therein so that the measured value is shifted toward the plus side based on the bypassing inertia effect upon the generation of a pulsation, thereby canceling the minus error. That technique is known and therefore a detailed described thereof is omitted here.

The present invention provides a technique capable of not only maintaining the above-mentioned bypassing effect, but also coping with the two-value phenomenon in more satisfactory manner.

Furthermore, near a throttle fully-opened stroke in a specific range of revolution speed, there occurs a pulsation in which a minimum value of the pulsation amplitude becomes below 0, i.e., a pulsation accompanying a backward flow. At that time, the output of the air flow rate measuring instrument jumps up to a large extent, thus resulting in a large plus error.

Such a plus error caused by the backward flow will be described with reference to FIGS. 3 to 5.

Figure 3:
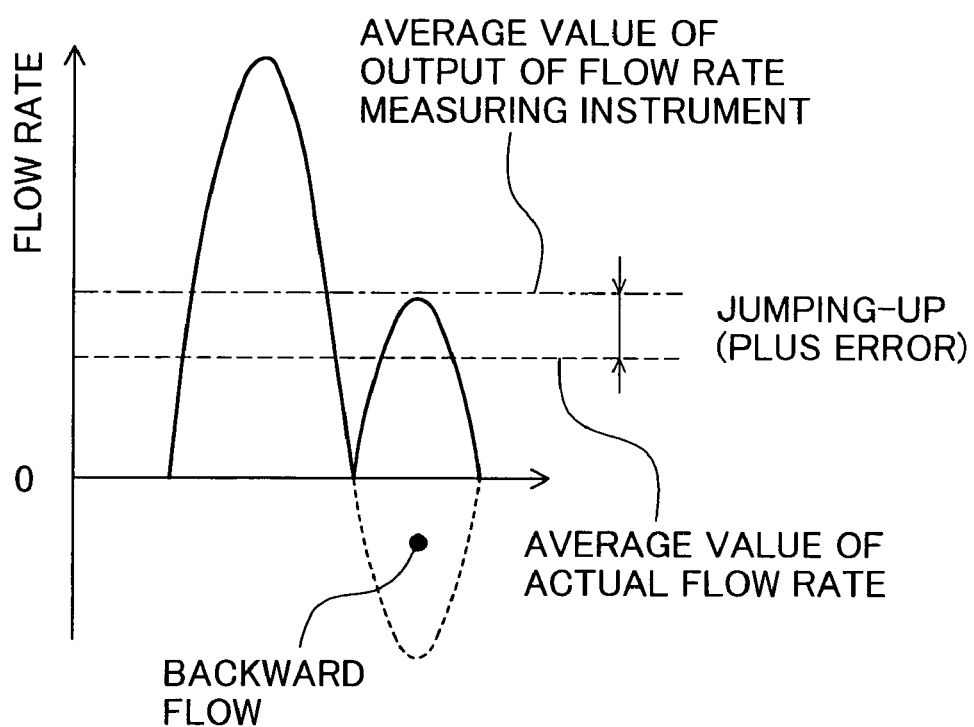
FIG. 3 is a graph showing the relationship between a plus error, which is caused in a prior-art heating resistor flow rate measuring instrument upon the generation of a pulsation accompanying a backward flow near a throttle fully-opened stroke, and the flow rate detected by the flow rate measuring instrument.

FIG. 3 is a graph showing the relationship between a jumping-up (plus error), which is caused in a prior-art heating resistor flow rate measuring instrument upon the generation of a pulsation accompanying a backward flow near a throttle fully-opened stroke, and an output of the flow rate measuring instrument, the graph being expressed as a waveform on an assumption that there is no response delay.

In FIG. 3, the heating resistor cannot discriminate the direction of the fluid flow and hence detects the backward flow as the forward flow in spite of that the actual backward flow should be detected as a minus value, as indicated by a dotted line. Accordingly, when the backward flow occurs, the average value (integrated value) of an output of the heating resistor includes a large positive error relative to the true value.

Figure 4:
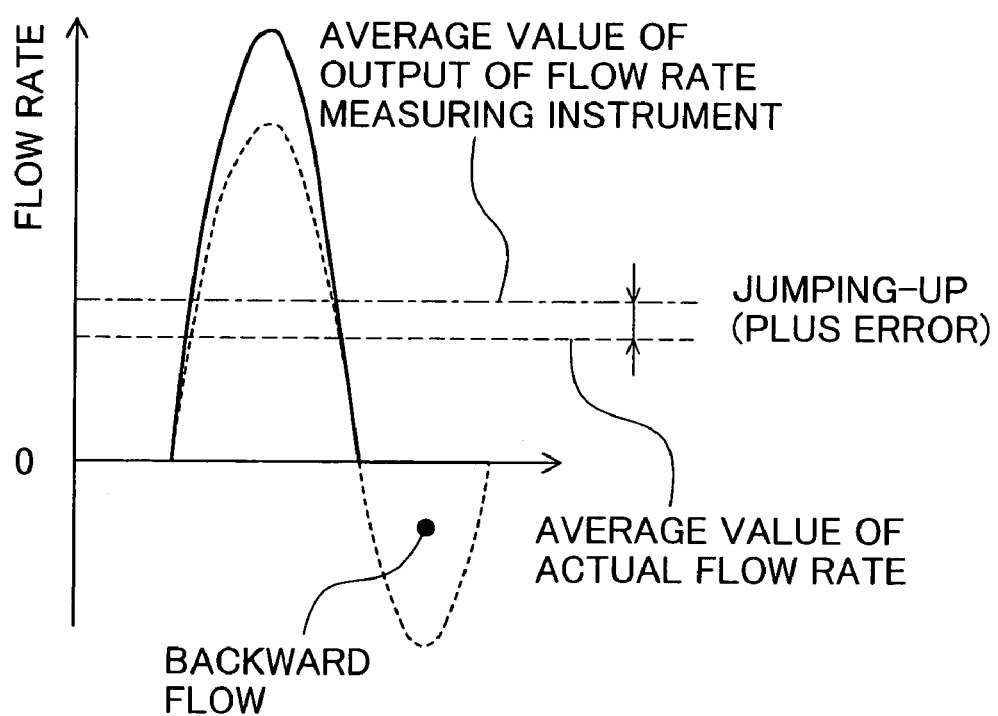
FIG. 4 is a graph showing an output of a bypassing flow rate measuring instrument resulting when a pulsation accompanying a backward flow occurs.

FIG. 4 is a graph showing an output of the so-called bypassing flow rate measuring instrument in which the heating resistor is less exposed to the backward flow by providing a sub-passage having a bent portion, for example, with intent to reduce the plus error, shown in FIG. 3, caused in the prior-art heating resistor air flow rate measuring instrument, the output being resulted when a pulsation accompanying a backward flow occurs, on an assumption that there is no response delay as in the graph of FIG. 3.

As seen from FIG. 4, optimization of the bypass passage can realize a structure in which, even when the backward flow generates in the main passage, the backward flow occurred in the bypass passage where the heating resistor is disposed can be held down very small. With that structure, it is possible to avoid the plus count of a minus value, which is caused because the heating resistor cannot detect whether the direction of the fluid flow is forward or backward.

However, optimization of the bypass passage cannot completely cancel the plus error caused by the backward flow. The reason is that while the true flow rate is given as the average value (integrated value) including the minus value resulting from the backward flow, the bypassing method provides the average value (integrated value) larger than the true value because the backward flow is just cut off without including the minus value in the average value (integrated value).

In other words, unless the output resulting from the forward flow is deduced from a total flow rate depending on the backward flow as indicated by a dotted line, the true flow rate and the output average value do not match with each other.

Figure 5:
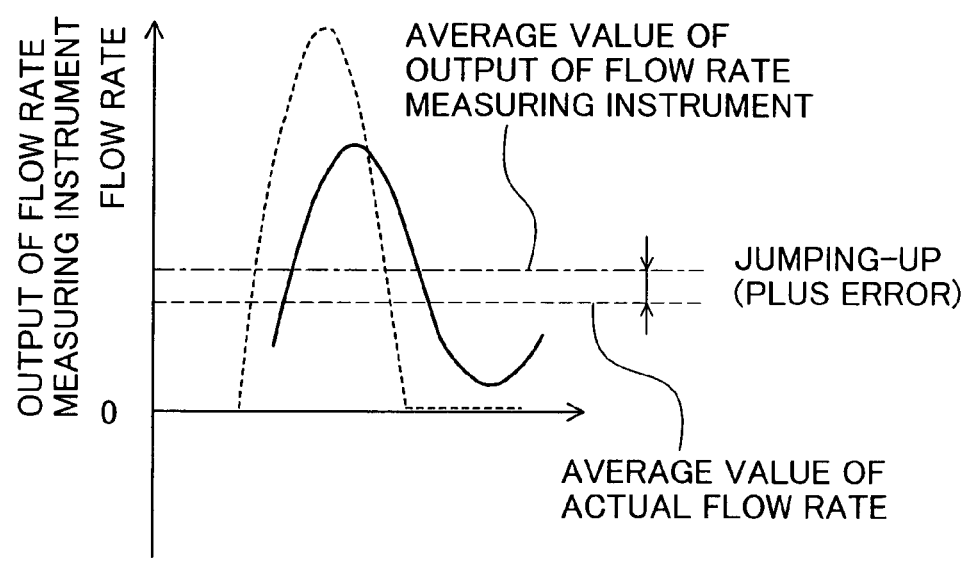
FIG. 5 is a graph showing the relationship between a plus error caused upon the generation of a pulsation accompanying a backward flow near a throttle fully-opened stroke and an output of the flow rate measuring instrument shown in FIG. 4.

FIG. 5 is a graph showing an actual output of the heating resistor flow rate measuring instrument as compared with the graph of FIG. 4 in which there is no response delay. The actual output of the heating resistor flow rate measuring instrument has a less-sharpened waveform, i.e., a waveform having a gentler slope than that of the true output, due to the response delay in the outputting.

In the actual heating resistor flow rate measuring instrument causing the response delay, as shown in FIG. 5, the plus error caused by the backward flow is reduced because of the two-value phenomenon described above as the known phenomenon, but it is not completely canceled.

The present invention is able to further compensate for the measurement error caused by the backward flow, which is not completely canceled by the bypassing method, while maintaining the bypassing effect.

Figure 6:
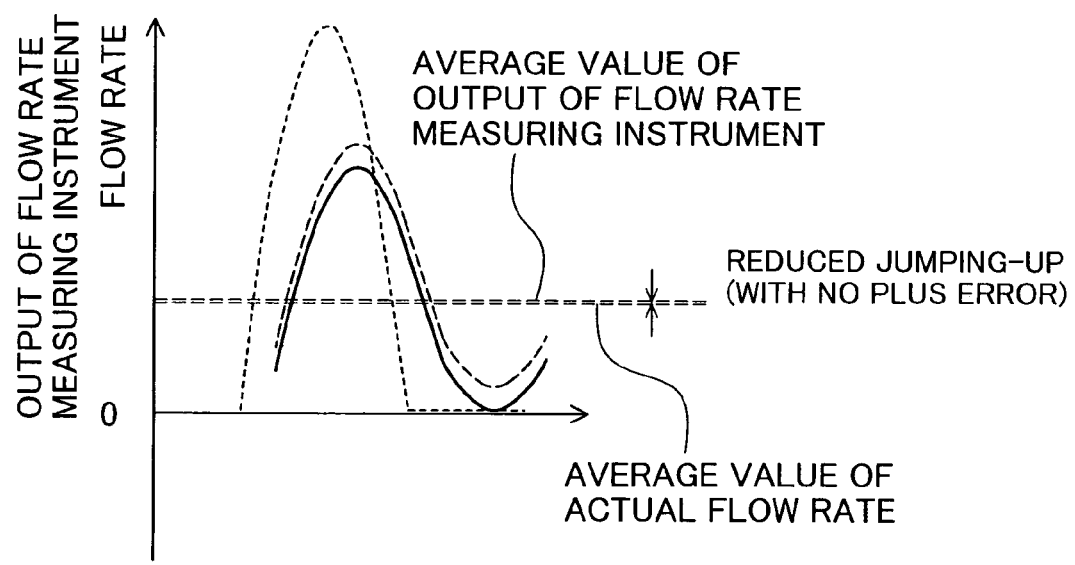
FIG. 6 is a graph showing the relationship between a plus error, which is caused in the heating resistor flow rate measuring instrument of the present invention upon the generation of a pulsation accompanying a backward flow near a throttle fully-opened stroke, and an output of the flow rate measuring instrument.

FIG. 6 is a graph showing the relationship between a jumping-up (plus error), which is caused in the heating resistor flow rate measuring instrument of the present invention upon the generation of a pulsation accompanying the backward flow near a throttle fully-opened stroke, and an output of the flow rate measuring instrument.

In the present invention, the heating resistor 1 is disposed in the bypass passage described above so as to suppress the two-value phenomenon based on the bypassing effect and to reduce the plus error caused by the backward flow. Further, in the present invention, as described above with reference to FIG. 1, the thermally sensitive resistor 2 is disposed to be more easily exposed to the backward flow than to the forward flow, and it is heated in advance to a level higher than the fluid temperature in the sub-passage by the predetermined temperature. With those features, when the backward flow 12 generates in the main passage 4, the temperature to which the heating resistor 1 is heated becomes lower, whereby the plus error can be further reduced which is caused in the heating resistor air flow rate measuring instrument upon the generation of a pulsation accompanying the backward flow.

A dotted line in FIG. 6 represents the output of the heating resistor air flow rate measuring instrument resulting when the influence of the backward flow is reduced by the optimization of the bypassing effect described above, while a solid line represents the output of the heating resistor air flow rate measuring instrument of the present invention.

With the present invention, for the fluid flowing only as the forward flow without including the backward flow, the flow rate measuring instrument produces the same output as that obtained with the bypassing method. Upon the generation of a pulsation accompanying the backward flow, however, the thermally sensitive resistor 2 is cooled by the backward flow, whereupon the temperature to which the heating resistor 1 is heated becomes lower and the amount of heat radiated from the heating resistor 1 is reduced. Accordingly, the output of the heating resistor air flow rate measuring instrument is reduced.

In practice, since the temperature of the thermally sensitive resistor 2 is maintained in a lowered state due to the response delay in the states of not only the backward flow, but also the forward flow, the instrument produces the output shifting toward the minus direction as a whole.

Thus, the plus error caused by the backward flow is reduced and the flow rate can be precisely detected even for a flow that may cause a pulsation accompanying the backward flow, such as intake air of an automobile engine.

A heating resistor air flow rate measuring instrument as a practical embodiment of the present invention will be described below with reference to FIGS. 7 to 13.

Figure 7:
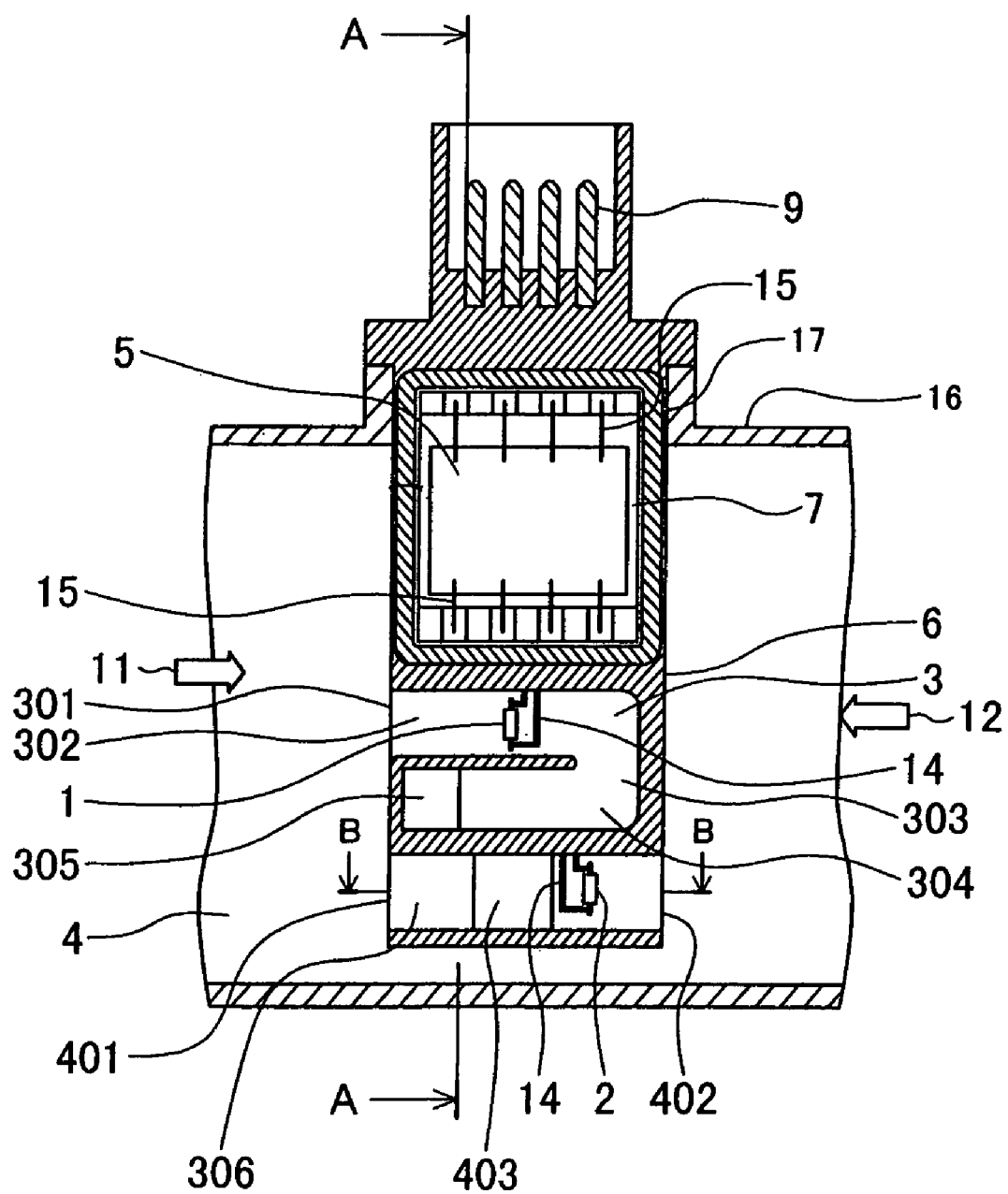
FIG. 7 is a sectional view of a heating resistor flow rate measuring instrument according to a first embodiment of the present invention.
Figure 8:
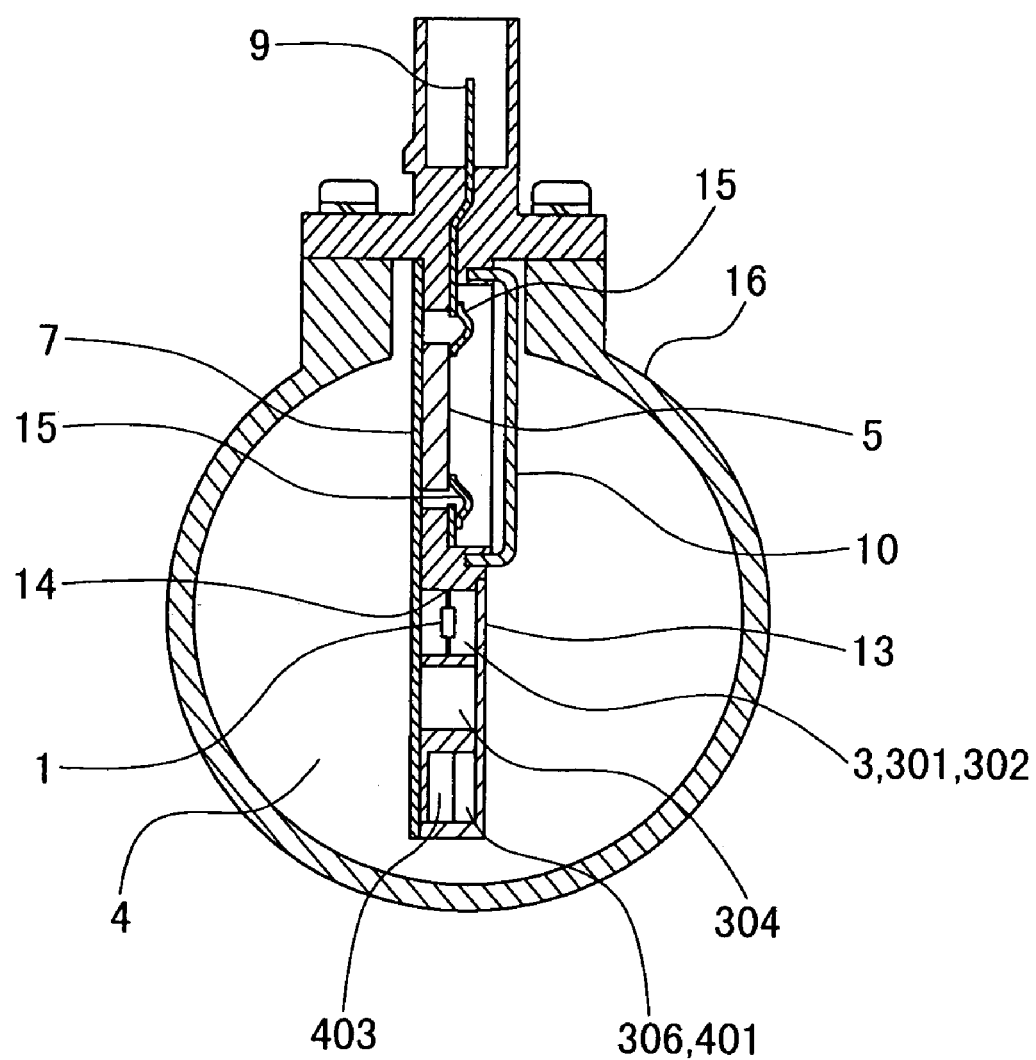
FIG. 8 is a sectional view taken along the line A—A in FIG. 7.

FIG. 7 is a sectional view showing a state in which a heating resistor flow rate measuring instrument according to a first embodiment of the present invention is mounted as a module in the main passage 4. FIG. 8 is a sectional view taken along the line A—A in FIG. 7, and FIG. 9 is a sectional view taken along the line B—B in FIG. 7.

Figure 9:
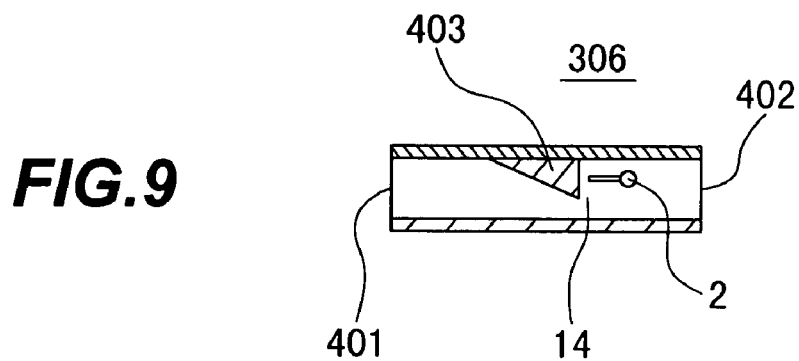
FIG. 9 is a sectional view taken along the line B—B in FIG. 7.

Referring to FIGS. 7 to 9, the heating resistor 1 and the thermally sensitive resistor 2 are disposed respectively in a first bypass 302 and a sub-passage (for arrangement of the thermally sensitive resistor) 306 of a bypass 3 while being fixed to corresponding terminals 14, and they are electrically connected to an electronic circuit 5 via metal wires 15.

A housing 6 for protectively containing the electronic circuit 5 is a plastic-molded part formed by insert molding with the terminals 14 and connector terminals 9 incorporated therein as metal terminals.

The housing 6 comprises the bypass 3 constituting a bent flow path in which the heating resistor 1 is disposed, a passage portion partly constituting a sub-passage 306 in which the thermally sensitive resistor 2 is disposed, a case portion forming a frame in which the electronic circuit 5 is mounted in a protective way, a connector portion in which the connector terminals 9 are disposed for electrical connection to an external device, and a flange portion used for fixing the flow rate measuring instrument to a member 16 that constitutes a main passage 4 described later, These components are formed integrally with each other.

The housing 6 and the electronic circuit 5 are fixedly bonded to a metal base 7, and the bypass 3 and the sub-passage 306 are completed by joining of a bypass cover 13 and a circuit cover 10 in respective places such that the electronic circuit 5 is protected at its surroundings. Thus, the flow rate measuring instrument is constructed as a module containing the circuit, the sensors, the sub-passage, the connector, etc. in an integral structure.

The main passage 4 is a flow path through which a fluid to be measured flows, and it corresponds to an intake pipe extending from an air cleaner to a position upstream of an engine cylinder, for example, when the present invention is applied to an automobile engine.

In a heating resistor air flow rate measuring instrument for use in an automobile, the member 16 constituting the main passage 4 is constituted as a body dedicated to the heating resistor air flow rate measuring instrument and connected to midway the intake pipe, or it is constituted by employing an air cleaner, a duct, a throttle body or the like in common.

An insertion hole 17 is formed in a wall of the main passage constituting member 16, and a measuring unit containing both the heating resistor 1 and the thermally sensitive resistor 2 mounted therein is inserted through the insertion hole 17 so as to position in the main passage 4. By fixing the housing 6 to the main passage constituting member 16, the instrument is set in a state capable of measuring the flow rate of air flowing through the main passage.

The bypass 3 is formed as a roundabout path made up of a bypass inlet 301 opened in a plane substantially perpendicular to a center axis of the main passage 4, a first bypass 302 extending substantially parallel to the center axis of the main passage 4, a roundabout portion 303 for reversing 180° the flow direction at a downstream end of the first bypass 302, a second bypass 304 extending substantially parallel to the first bypass in the opposite direction, and a bypass outlet 305 opened at a downstream end of the second bypass 304 in a plane substantially perpendicular to the center axis of the main passage 4.

The heating resistor 1 is disposed, as described above, in the first bypass 302 of the roundabout bypass 3. Thus, a structure is obtained in which, when the backward flow 12 generates in the main passage 4, the backward flow is hard to flow in up to the location where the heating resistor 1 is disposed.

The sub-passage 306 is formed as a straight tubular path having a sub-passage inlet 401 opened in a plane substantially perpendicular to the center axis of the main passage 4, and a sub-passage outlet 402 formed downstream of the sub-passage inlet.

A projection-shaped flow restrictor 403 is formed in the tubular path of the sub-passage 306, and the thermally sensitive resistor 2 is disposed in a position shielded by the flow restrictor 403 when viewed from the upstream side.

Accordingly, when the forward flow 11 flows in the main passage 4, the presence of the flow restrictor 403 forms a region in which the fluid flow turns to a separated flow at a location where the thermally sensitive resistor 2 is disposed. Hence, the separated flow has a very low flow speed as compared with that of a flow reaching the location where the thermally sensitive resistor 2 is disposed when the backward flow 12 flows in the main passage 4.

The electronic circuit 5 is constituted as containing a circuit shown in FIG. 1 and has a bridge circuit including the heating resistor 1 (Rh) and the thermally sensitive resistor 2 (Rc). More specifically, one end of the heating resistor 1 is connected to the other end of the heating resistor 1 through resistors R1, R2, the thermally sensitive resistor 2, and a resistor R3.

Further, the junction between the resistors R1 and R2 is grounded, and the junction between the thermally sensitive resistor 2 and the resistor R2 is connected to one input terminal of an operational amplifier OP1. An output terminal of the operational amplifier OP1 is connected to the base of a transistor Tr, and the emitter of the transistor Tr is connected to the junction between the resistor R3 and the heating resistor 1.

In addition, the junction between the thermally sensitive resistor 2 and the resistor R1 is connected to the other input terminal of the operational amplifier OP1.

The junction between the thermally sensitive resistor 2 and the resistor R1 is also connected to one input terminal of an operational amplifier OP2, and further connected to an output terminal of the operational amplifier OP2 through a resistor R4.

The other input terminal of the operational amplifier OP2 is connected to a reference voltage source Vref through a resistor R5 and is also grounded through a resistor R6.

After balancing the bridge circuit including the heating resistor 1 and the thermally sensitive resistor 2, electric currents Ih and Ic flowing respectively through the heating resistor 1 and the thermally sensitive resistor 2 are adjusted so that the heating resistor 1 is sufficiently heated (for example, to the fluid temperature +200° C., i.e., the temperature of the thermally sensitive resistor +160° C.) and the thermally sensitive resistor 2 is slightly heated (for example, to the fluid temperature +40° C.).

With the construction described above, the flow rate can always be precisely measured even for a flow that may change from a steady flow to a pulsating flow and further to a pulsating flow accompanying a backward flow, such as intake air of an automobile engine.

Stated another way, when a pulsating flow generates and a pulsation increases to such an extent that a minimum flow speed becomes close to 0, the minus error called the two-value phenomenon occurs as described above. By arranging the heating resistor 1 in the roundabout bypass 3, however, the minus error can be suppressed and canceled with the bypassing inertia effect mentioned above.

Further, when the pulsation amplitude increases and generates a pulsating flow accompanying a backward flow, the structure of the roundabout bypass 3 serves to suppress the backward flow from flowing in up to the location where the heating resistor 1 is disposed.

Those advantages are also obtained with the prior art, but a reduction of the plus error caused by the backward flow is not yet sufficient, as described above.

With the first embodiment of the present invention, since the thermally sensitive resistor 2 slightly heated is disposed in the sub-passage 306 such that the thermally sensitive resistor 2 is harder to be exposed to the forward flow and is more easily exposed to the backward flow, the thermally sensitive resistor 2 is cooled by the fluid upon the generation of the backward flow and the temperature of the heating resistor 1, which is controlled to be held at a level higher than that of the thermally sensitive resistor 2 by the predetermined temperature, is reduced.

Accordingly, the amount of heat radiated from the heating resistor 1 to the fluid is also reduced and so is an electric current supplied for the heating. In other words, the measured value of the flow rate is shifted toward the minus side upon detection of the backward flow, whereby the plus error caused by the backward flow is canceled and the measurement can be made at higher accuracy.

In practice, the thermally sensitive resistor 2 is also cooled by the forward flow depending on the flow rate, but the measurement accuracy in the state of the forward flow can be maintained by measuring the relationship between the flow rate and the output in the state of the forward flow beforehand and obtaining an output characteristic of the heating resistor air flow rate measuring instrument based on the measured relationship.

Thus, the highly precise measurement can be achieved not only in the state of the forward flow, but also when a pulsation accompanying the backward flow occurs.

Figure 10:
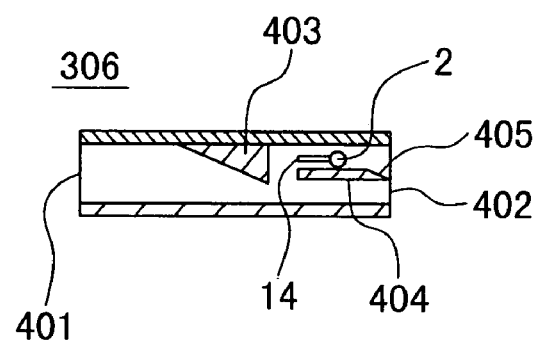
FIG. 10 is a sectional view of a sub-passage in a heating resistor flow rate measuring instrument according to a second embodiment of the present invention.

FIG. 10 is a schematic sectional view of a sub-passage 306 in a heating resistor flow rate measuring instrument according to a second embodiment of the present invention. The other construction than the sub-passage is the same as that of the above-described first embodiment, and hence illustration and a detailed description thereof are omitted here.

In the second embodiment of the present invention, the configuration of the sub-passage 306 is somewhat modified from that in the first embodiment.

Note that, similarly to FIG. 9, FIG. 10 is a sectional view taken along the line B—B in FIG. 7.

In the second embodiment, as shown in FIG. 10, a partition 404 extending in the lengthwise direction of the sub-passage 306 is formed in the sub-passage 306 for the purpose of further reducing the flow speed of the fluid in the state of the forward flow at the location where the thermally sensitive resistor 2 is disposed.

Additionally, the partition 404 has a taper 405 formed so as to define a tubular path gradually widening toward the downstream side of the sub-passage 306. The presence of the taper 405 contributes to increasing the amount of the backward flow flowing toward the side near the thermally sensitive resistor 2.

The sub-passage 306 thus constructed can provide similar advantages to those obtained with the first embodiment. In addition, since the second embodiment produces a larger difference in temperature of the thermally sensitive resistor 2 between the state of the forward flow and the state of the backward flow than that in the first embodiment, a larger minus shift is obtained in the state of the backward flow and the plus error caused by the backward flow can be further reduced.

Figure 11:
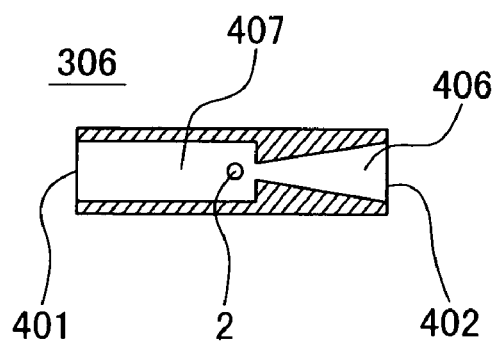
FIG. 11 is a sectional view of a sub-passage in a heating resistor flow rate measuring instrument according to a third embodiment of the present invention.

FIG. 11 is a schematic sectional view of a sub-passage 306 in a heating resistor flow rate measuring instrument according to a third embodiment of the present invention. The other construction than the sub-passage is the same as that of the above-described first embodiment, and hence illustration and a detailed description thereof are omitted here.

In the third embodiment of the present invention, as in the second embodiment, the configuration of the sub-passage 306 is somewhat modified from that in the first embodiment.

As shown in FIG. 11, the sub-passage 306 is formed such that it provides a simple tubular path 407 in the upstream side, abruptly narrows at the downstream end of the tubular path 407, and then provides a tubular path 406 gradually widening toward the downstream side. The thermally sensitive resistor 2 is disposed at the downstream end of the tubular path 407 to lie on an extension of the center axis of the gradually widening tubular path 406.

With the sub-passage 306 according to the third embodiment, in the state of the forward flow, the resistance against passage of the fluid increases and the flow rate of the incoming fluid reduces correspondingly. In the state of the backward flow, the backward flow flows as a jet into the simple tubular path 406 from the gradually widening tubular path 407, and therefore the effect of cooling the thermally sensitive resistor 2 is increased.

The third embodiment can also provide similar advantages to those obtained with the first embodiment.

Figure 12:
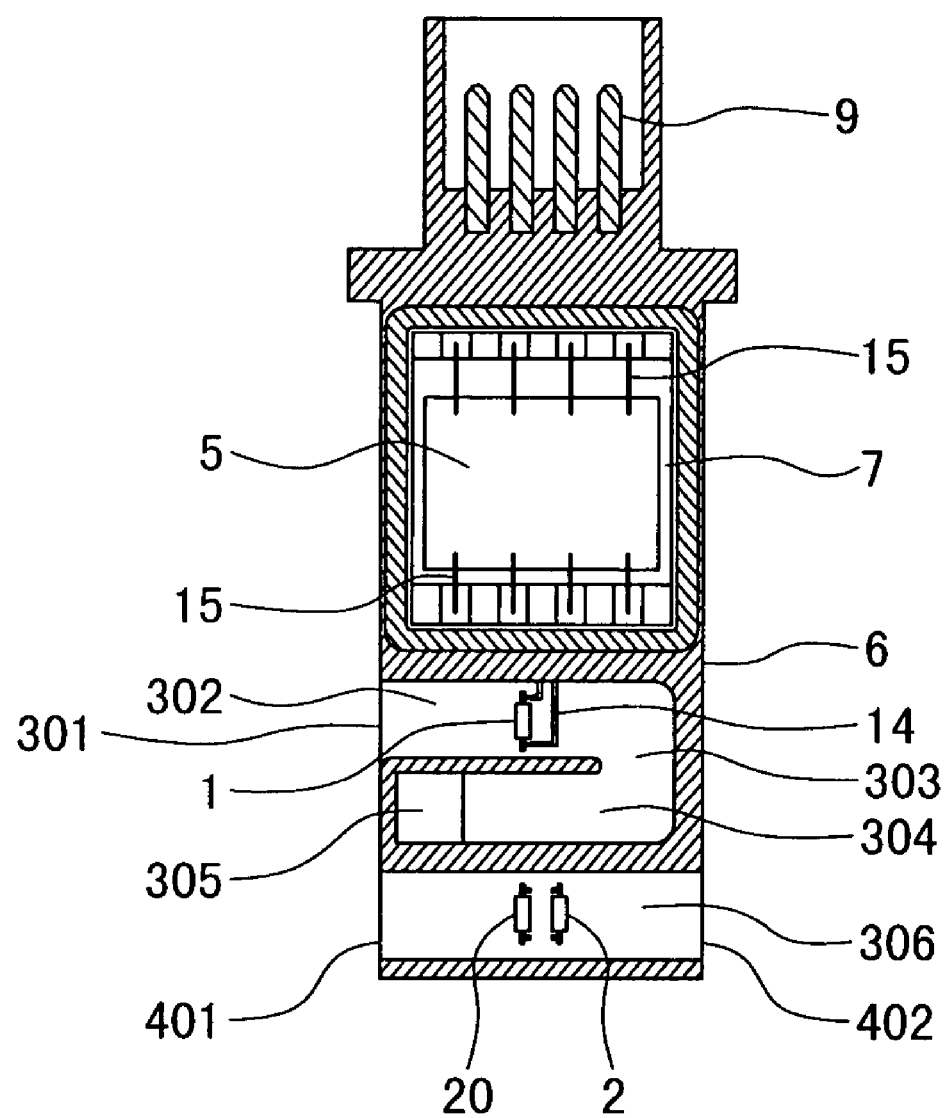
FIG. 12 is a schematic sectional view of a heating resistor flow rate measuring instrument according to a fourth embodiment of the present invention.
Figure 13:
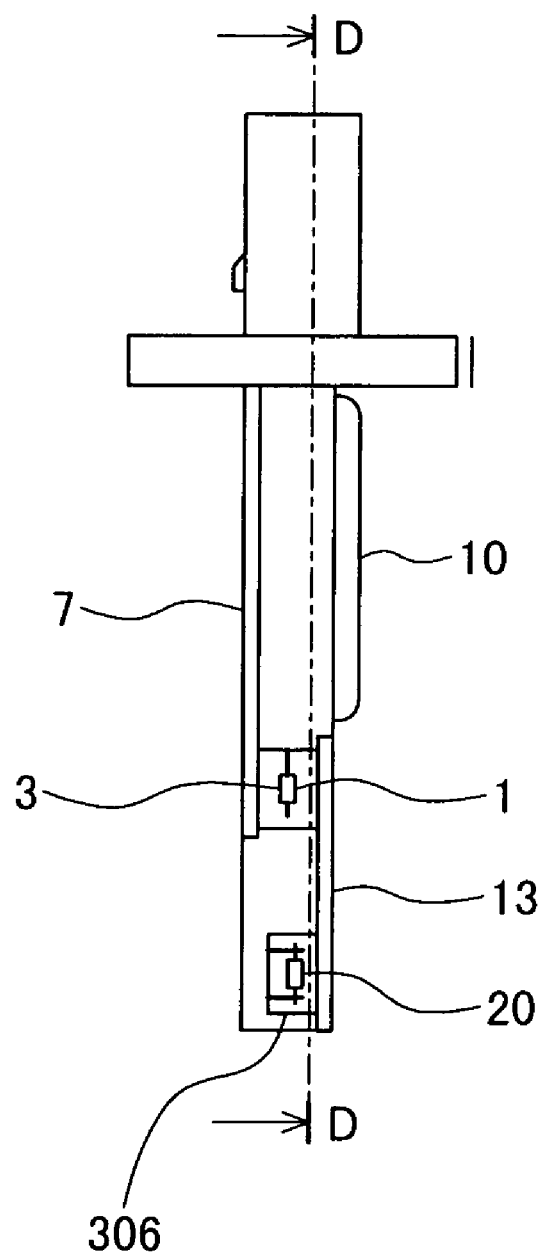
FIG. 13 is an external appearance view, looking from the upstream side, of the heating resistor flow rate measuring instrument according to the fourth embodiment of the present invention.

Next, a heating resistor flow rate measuring instrument according to a fourth embodiment of the present invention will be described with reference to FIGS. 12 and 13. In this fourth embodiment, the thermally sensitive resistor 2 is heated in a different manner from that in the first embodiment. FIG. 12 is a cross-sectional view of an instrument module with the main passage 4 omitted, and FIG. 13 is an external appearance view, looking from the upstream side, of the instrument module. Note that FIG. 12 corresponds to a section taken along the line D—D in FIG. 13.

An overall construction of the fourth embodiment is the same as that of the first embodiment, and therefore the following description is made of only different points from the first embodiment.

The biggest difference between the first embodiment and the fourth embodiment is as follows. In the first embodiment, the thermally sensitive resistor 2 is of the self-heating type that an electric current is applied to the thermally sensitive resistor 2 to heat it. In the fourth embodiment, however, the thermally sensitive resistor 2 is not of the self-heating type, and a separate heater 20 is disposed upstream of the thermally sensitive resistor 2 so that the thermally sensitive resistor 2 is heated by the heater 20.

More specifically, in the fourth embodiment, a heat flow generated under heating by the heater 20 heats the thermally sensitive resistor 2 in the state of the forward flow. On the other hand, in the state of the backward flow, the thermally sensitive resistor 2 is not affected by the temperature of the heater 20 and is cooled so as to approach the fluid temperature. Therefore, the temperature of the thermally sensitive resistor 2 differs between the state of the forward flow and the state of the backward flow.

In the fourth embodiment, the sub-passage 306 can be formed as a simple tubular path, and a flow restrictor or the like is not required. Further, the temperature to which the thermally sensitive resistor 2 is heated in the state of the forward flow can be adjusted depending on the spacing between the heater 20 and the thermally sensitive resistor 2 and on an extent by which they overlap with each other.

The fourth embodiment can also provide similar advantages to those obtained with the first embodiment.

While the heating resistor 1 and the thermally sensitive resistor 2 are disposed in the sub-passage 3 in the embodiments described above, the locations where the heating resistor 1 and the thermally sensitive resistor 2 are disposed are not limited to positions in the sub-passage.

Specifically, the heating resistor 1 may be disposed at a first location within the main passage 4 where the heating resistor 1 is exposed to the fluid flowing in one direction within the main passage 4 in a larger amount than the fluid flowing in a direction opposite to the one direction, while the thermally sensitive resistor 2 may be disposed at a second location within the main passage 4 where the thermally sensitive resistor 2 is exposed to the fluid flowing in the opposite direction within the main passage 4 in a larger amount than the fluid flowing in the one direction within the main passage 4.

Also, the first sub-passage may have a first opening that faces substantially perpendicular to the fluid flowing in the forward direction (one direction), and a second opening that faces substantially perpendicular to the fluid flowing in the opposite direction and has a smaller opening area than the first opening. The second sub-passage may have a third opening that faces substantially perpendicular to the fluid flowing in the forward direction, and a fourth opening that faces substantially perpendicular to the fluid flowing in the opposite direction and has a larger opening area than the third opening. Then, the heating resistor 1 may be disposed in the first sub-passage and the thermally sensitive resistor 2 may be disposed in the second sub-passage.

Another modification may be constructed as follows. A first heating resistor radiating a larger amount of heat in the state of the forward flow than in the state of the backward flow and a second heating resistor radiating a larger amount of heat in the state of the backward flow than in the state of the forward flow are both disposed in the main passage 4, and a bridge circuit including the first heating resistor and the second heating resistor is formed. Then, an applied electric current is controlled so that the first heating resistor is held at a temperature higher than the second heating resistor by a certain temperature. The flow rate of the fluid passing through the main passage 4 is measured based on the amount of heat radiated from the first heating resistor.

INDUSTRIAL APPLICABILITY

According to the present invention, in the heating resistor flow rate measuring instrument, when the fluid flows in the forward direction, the heating resistor 1 outputs a value depending on the flow rate of the fluid. When the fluid flows in the opposite direction, the thermally sensitive resistor 2 is cooled to a temperature lower than that resulting when the fluid flows in the forward direction, and an electric current flowing through the heating resistor 1 is decreased. As a result, even when a pulsation occurs in the fluid, a precise flow rate can be measured because not only a plus effect caused by the backward flow is eliminated, but also a value corresponding to the backward flow is subtracted.

It is hence possible to precisely detect the flow rate in the forward direction even for a fluid that may cause a pulsation accompanying a backward flow, such as intake air of an automobile engine.

Particularly, in measurement of the flow rate of intake air of an automobile engine, a large plus error resulting when a pulsation accompanying a backward flow occurs near a throttle fully-opened stroke in a specific range of revolution speed can be eliminated and fuel control precisely responsive to operation conditions can be achieved.

The invention claimed is:

1. A heating resistor flow rate measuring instrument comprising a heating resistor and a thermally sensitive resistor both disposed in a main passage, and measuring the flow rate of a fluid passing through said main passage, said instrument including:
   a first sub-passage exposed to the fluid flowing in one direction within said main passage in a larger amount than the fluid flowing in a direction opposite to the one direction; and
   a second sub-passage exposed to the fluid flowing in the opposite direction within said main passage in a larger amount than the fluid flowing in the one direction,
   wherein said heating resistor is disposed at said first sub-passage, said thermally sensitive resistor is disposed at said second sub-passage, the flow rate of the fluid passing through said main passage is measured based on amounts of heat radiated from said heating resistor and said thermally sensitive resistor, and the shape of said first sub-passage is different from that of said second sub-passage.

2. The heating resistor flow rate measuring instrument according to claim 1, wherein said heating resistor is heated to be higher than a fluid temperature in said main passage by a first predetermined temperature, and said thermally sensitive resistor is heated to be higher than the fluid temperature in said main passage by a second predetermined temperature.

3. The heating resistor flow rate measuring instrument according to claim 1 or 2, wherein said first sub-passage has a first opening that faces substantially perpendicular to the fluid flowing in the one direction, and a second opening that faces substantially parallel to the fluid flowing in the opposite direction, and said second sub-passage has a third opening that faces substantially perpendicular to the fluid flowing in the opposite direction, and a fourth opening that faces substantially parallel to the fluid flowing in the one direction.

4. The heating resistor flow rate measuring instrument according to claim 1 or 2, wherein said first sub-passage has a first opening that faces substantially perpendicular to the fluid flowing in the one direction, and a second opening that faces substantially parallel to the fluid flowing in the opposite direction, and a wall portion having a surface substantially perpendicular to the lengthwise direction of said main passage is formed in the one-direction side of said second sub-passage.

5. The heating resistor flow rate measuring instrument according to claim 1 or 2, wherein said first location is provided by a first sub-passage having a first opening that faces substantially perpendicular to the fluid flowing in the one direction, and a second opening that faces substantially perpendicular to the fluid flowing in the opposite direction and has a smaller opening area than said first opening, and said second location is provided by a second sub-passage having a third opening that faces substantially perpendicular to the fluid flowing in the one direction, and a fourth opening that faces substantially perpendicular to the fluid flowing in the opposite direction and has a larger opening area than said third opening.

6. The heating resistor flow rate measuring instrument according to claim 1 or 2, wherein said thermally sensitive resistor is heated to a temperature 20° C.–40° C. higher than the fluid temperature in said main passage.

7. The heating resistor flow rate measuring instrument according to claim 1, wherein said first sub-passage includes a curved portion.

8. The heating resistor flow rate measuring instrument according to claim 1, wherein a partition extending in the lengthwise direction of the second sub-passage is formed in the second sub-passage.

9. The heating resistor flow rate measuring instrument according to claim 8, wherein said partition has a taper portion which defines a tubular path gradually widening toward the downstream side of the second sub-passage.

10. The heating resistor flow rate measuring instrument according to claim 1, wherein said second sub-passage includes a simple tubular path in the upstream side, and a tubular path gradually widening toward the downstream side, the downstream end of said simple tubular path narrowing abruptly.

11. The heating resistor flow rate measuring instrument according to claim 1, wherein a projection-shaped flow resistor is formed in the tubular path of said second sub-passage and the thermally sensitive resister is arranged in a position shielded by the flow sensor when viewed from the upstream side.

12. A heating resistor flow rate measuring instrument for measuring the flow rate of a fluid passing through a passage, said instrument comprising:

a first heating resistor radiating a larger amount of heat to the fluid flowing in one direction within said passage than to the fluid flowing in a direction opposite to the one direction; and a second heating resistor radiating a larger amount of heat to the fluid flowing in the opposite direction than to the fluid flowing in the one direction;

wherein a bridge circuit including said first heating resistor and said second heating resistor is formed, said first heating resistor is heated to be higher than said second heating resistor by a predetermined temperature, and the flow rate of the fluid passing through said passage is measured based on the amount of heat radiated from said first heating resistor.

13. A heating resistor flow rate measuring instrument comprising a heating resistor and a thermally sensitive resistor both disposed in a main passage, and measuring the flow rate of a fluid passing through said main passage, wherein:

said instrument includes a thermally-sensitive-resistor arrangement sub-passage in which said thermally sensitive resistor is disposed and radiates a larger amount of heat when the fluid flows in a direction opposite to one direction within said main passage than when the fluid flows in the one direction; said heating resistor is heated to be higher than a fluid temperature in said passage by a first predetermined temperature; said thermally sensitive resistor is heated to be higher than the fluid temperature in said passage by a second predetermined temperature; and the flow rate of the fluid passing through said passage is measured based on amounts of heat radiated from said heating resistor and said thermally sensitive resistor.

14. The heating resistor flow rate measuring instrument according to claim 13, wherein said heating resistor is disposed at a location in which said heating resistor radiates a larger amount of heat when the fluid flows in the one direction within said main passage than when the fluid flows in the opposite direction.

* * * * *